(12) United States Patent
Lelkes

(10) Patent No.: US 10,853,701 B2
(45) Date of Patent: Dec. 1, 2020

(54) FILLING DEVICE

(71) Applicant: Andras Lelkes, Nuremberg (DE)

(72) Inventor: Andras Lelkes, Nuremberg (DE)

( * ) Notice: Subject to any disclaimer, the term of this patent is extended or adjusted under 35 U.S.C. 154(b) by 122 days.

(21) Appl. No.: 16/181,375

(22) Filed: Nov. 6, 2018

(65) Prior Publication Data

US 2019/0138858 A1  May 9, 2019

(30) Foreign Application Priority Data

Nov. 8, 2017 (DE) .......................... 10 2017 126 159

(51) Int. Cl.
*G06K 9/00* (2006.01)
*G06K 9/62* (2006.01)
(Continued)

(52) U.S. Cl.
CPC ......... *G06K 9/6277* (2013.01); *B67D 1/0878* (2013.01); *G06K 9/00* (2013.01); *G06K 9/6262* (2013.01); *G06K 9/6273* (2013.01); *G06K 9/66* (2013.01); *G06N 3/084* (2013.01); *G06K 9/00375* (2013.01)

(58) Field of Classification Search
CPC .... G06K 9/6277; G06K 9/00375; G06K 9/00; G06K 9/6262; G06K 9/6273; G06K 9/66; G06K 9/627; G06K 9/6217; G06K 9/6269; B67D 1/0878; B67D 1/04; B67D 1/06; B67D 1/08; B67D 1/124; B67D 1/1236; B67D 1/0884; B67D 1/1238; B67D 1/0888; B67D 3/0003; B67C 3/26; B67C 3/007; B67C 3/065; B67C 3/10; B67C 3/12; B67C 3/286; B67C 3/02; G06N 3/084; G06N 3/0454; G06N 20/10; G06N 7/005; A47J 31/44; A47J 31/4482; A47J 31/40; A47J 31/525; A47J 2203/00; G01F 23/292; G01F 23/2921; G01F 23/2928; G01F 17/00; B67B 3/26; G01N 21/9027; Y10S 367/908
See application file for complete search history.

(56) References Cited

U.S. PATENT DOCUMENTS 10,618,790 B2 * 4/2020 Ohrem .................... B67C 3/286
10,674,857 B2 * 6/2020 Lyons ................... A47J 31/005
(Continued)

FOREIGN PATENT DOCUMENTS

DE         102 39 595 A1    3/2004
DE    20 2008 015 525 U1    3/2009
(Continued)

*Primary Examiner* — Jose L Couso
(74) *Attorney, Agent, or Firm* — Norman B. Thot

(57) ABSTRACT

A method for preventing a malfunction of a filling device when a container is filled by a user with a beverage. The method includes providing a filling device comprising a control unit which controls the filling device, a camera which takes an image of a container currently being used with the filling device and which outputs the image to a classifier which then uses a trained learning algorithm to analyze the output of the image of the container provided by the camera. The trained learning algorithm of the classifier analyzes which container is currently being used based on characteristics of the container so as to classify the container into a predefined class. The predefined class is then employed by the control unit to prevent the malfunction of the filling device.

12 Claims, 3 Drawing Sheets

(51) Int. Cl.
    *G06K 9/66*     (2006.01)
    *B67D 1/08*     (2006.01)
    *G06N 3/08*     (2006.01)

(56) References Cited

U.S. PATENT DOCUMENTS

| | | | |
|---|---|---|---|
| 2006/0108023 A1 | 5/2006 | Greiwe et al. | |
| 2007/0107801 A1* | 5/2007 | Cochran | B65B 57/145 |
| | | | 141/153 |
| 2009/0095165 A1* | 4/2009 | Nosler | A47J 31/40 |
| | | | 99/289 R |
| 2010/0082149 A1* | 4/2010 | Till | B67C 3/007 |
| | | | 700/214 |
| 2011/0214441 A1* | 9/2011 | Ashrafzadeh | F25D 23/126 |
| | | | 62/129 |
| 2016/0052764 A1* | 2/2016 | Fuhrer | B67C 3/007 |
| | | | 348/143 |
| 2018/0022593 A1* | 1/2018 | Feola | G06Q 20/34 |
| | | | 700/232 |
| 2018/0330315 A1* | 11/2018 | Gurumohan | H04W 76/14 |
| 2019/0377973 A1* | 12/2019 | Jin | B67D 1/0894 |

FOREIGN PATENT DOCUMENTS

| | | |
|---|---|---|
| DE | 10 2011 075 194 A1 | 11/2012 |
| DE | 10 2014 017 490 A1 | 6/2016 |

\* cited by examiner 2a.  2b.  2c.

FILLING DEVICE

CROSS-REFERENCE TO RELATED APPLICATIONS

Priority is claimed to German Patent Application No. DE 10 2017 126 159.1, filed Nov. 8, 2017. The entire disclosure of said application is incorporated by reference herein.

FIELD

The present invention relates to a method for enabling filling devices, such as beverage vending machines, in particular automatic coffee machines, to respond intelligently to operating conditions, and to a filling device using the method.

BACKGROUND

Conventional filling devices, especially coffee machines and automatic coffee makers, which are installed, for example, in breakfast rooms of hotels and in conference rooms, do not usually monitor whether the correct coffee cup or the correct glass was used. The beverage, for example, coffee, may therefore overflow. This is in particular the case when a guest uses his/her own coffee cup rather than a coffee cup usually used in the coffee machine.

DE 20 2008 015 525 U1 describes an electric household appliance, such as an electric coffee machine. A separately manageable part, such as a cup, is provided with an encoding which is detected by a detection unit, with this information being transmitted to the control unit.

DE 10 2014 017 490 A1 describes a device and a corresponding method for detecting the size of a fillable container or the level of a liquid in the container. A reflection light barrier with a beam source and a sensor, such as a photodiode, is used therefor.

DE 10 2011 075 194 A1 describes a beverage vending machine and a beverage filling method with which the vending machine sensorially estimates the filling volume of the container to be filled. An image processing device thereby measures the geometry of the coffee cup and the liquid level. The filling volume of the coffee cup is calculated therefrom.

SUMMARY

An aspect of the present invention is to enable a filling device to identify the containers in use and, accordingly, to affect the operation of the device. In the case of a coffee machine, for example, the type of cup or glass employed by the user can be detected. The beverage options can then be limited based on the container detected.

In an embodiment, the present invention provides a method for preventing a malfunction of a filling device when a container is filled by a user with a beverage. The method includes providing a filling device comprising a control unit which is configured to control the filling device by at least one of limiting a selection of the beverage, preventing an incorrect selection of the beverage, stopping a dispensing of the beverage, and providing a warning to the user, a camera which is configured to take an image of a container which is currently being used with the filling device and to output the image thereof to a classifier, and the classifier which uses a trained learning algorithm which is trained to analyze the output of the image provided by the camera of the container currently being used with the filling device. The image of the container which is currently being used with the filling device is taken via the camera. The image of the container which is currently being used with the filling device is outputted from the camera to the classifier. The trained learning algorithm of the classifier analyzes which container is currently being used with the filling device based on characteristics of the container currently being used with the filling device so as to classify the container into a predefined class. The predefined class is employed by the control unit to prevent the malfunction of the filling device.

BRIEF DESCRIPTION OF THE DRAWINGS

The present invention is described in greater detail below on the basis of embodiments and of the drawings in which.

DETAILED DESCRIPTION

Figure 1:
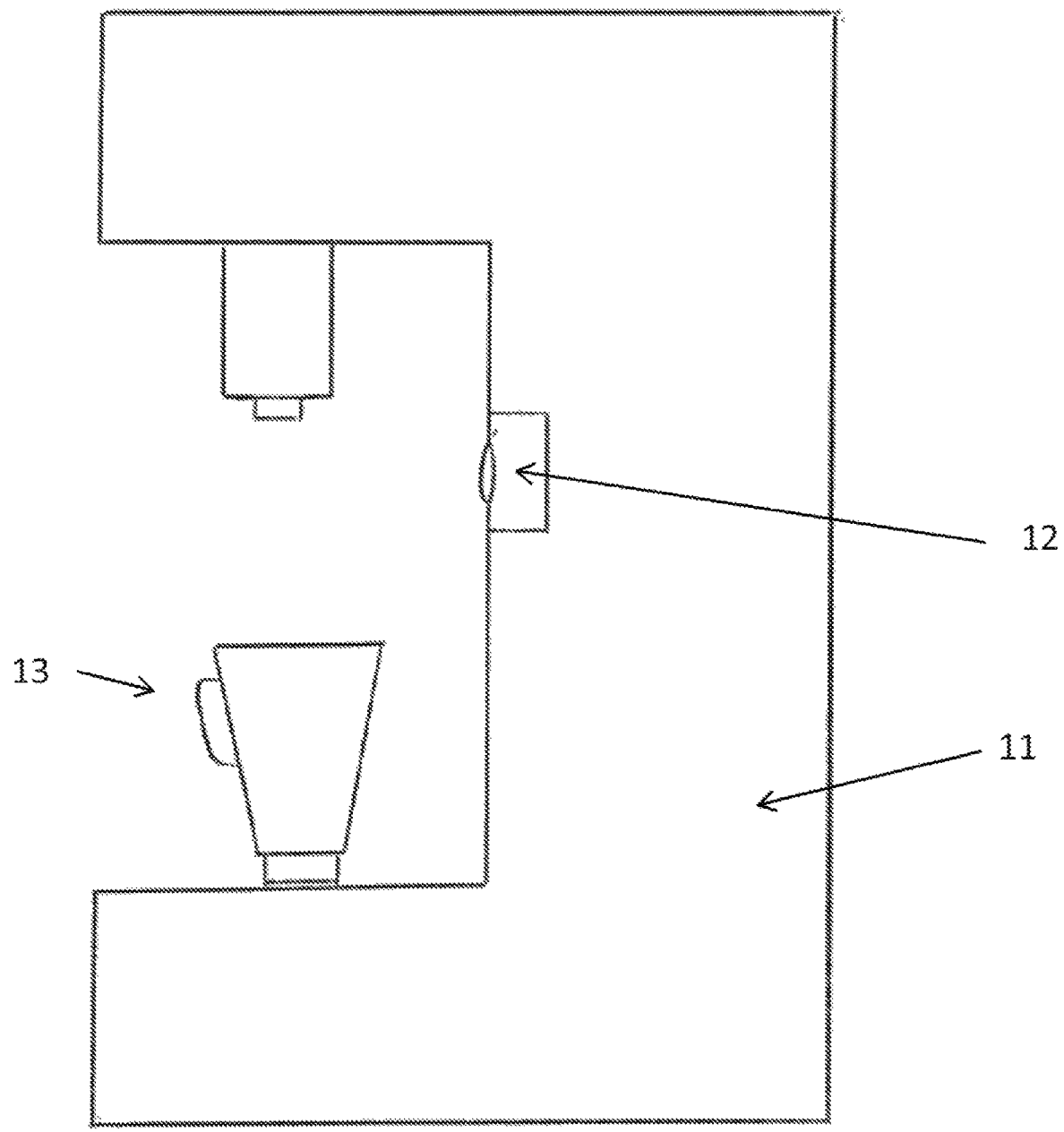
FIG. 1 shows a coffee machine as an example for the filling device according to the present invention.

Learning machines are known to be able to categorize various objects. The present invention therefore proposes that at least one sensor, which is referred to below as a detection sensor, be used and the signals of the detection sensor be evaluated by at least one classifier.

The detection sensor of the present invention can, for example, be an optical sensor, for example, a camera, however, sensors may be used in accordance with other physical principles. It is, for example, possible to use a capacitive or inductive sensor. Another possibility is to use acoustic sensors, for example, an ultrasonic sensor that works with the echo effect. It is also possible to use a combination of several sensors based either on the same or different physical effects.

The classifier has the task of sorting the different containers in different categories. One way to implement this classifier is for the designer to analyze the signals from the detection sensor when using different containers, to define distinguishing features, and to design the classifier so that it can successfully classify the containers based on the characteristics.

Another method is the use of machine learning algorithms by the classifier. The developer thereby does not have to define the distinguishing features. The developer can instead train the machine learning classifier with different containers, and the classifier itself learns to classify the various containers.

In a so-called unsupervised classifier, for example, according to the "k-means clustering" method, the classifier learns to classify the signals into classes which do not need to be defined by the developer.

Because the developer of the filling device or its classifier usually already knows the desired classes at an early stage of development, greater advantage might be obtained if supervised learning is used in the development. The learning algorithm here needs to learn from the signals of the recognition sensor to divide the containers into previously defined classes. The learning algorithm is thereby trained with the aid of typical sample containers provided for the training therefor.

Some well-known methods for supervised learning include: Decision Tree Learning, Logistic Regression, Artificial Neural Networks, Deep Learning, Naive Bayes, Bayesian Network, Support Vector Machine, Markov Chain, Hidden Markov Model, and Boosting.

In the case of image recognition or image categorization, neural networks with several hidden layers, i.e., the so-called "deep learning" method, are now being used successfully. One of the often used methods is a "convolutional neural network" (CNN). The use of neural networks is advantageous because no features must be defined by the developer. The sensor signals, such as the brightness and color of the individual digital image matrix elements (pixels), are instead fed from a camera as a vector to the input layer of the neural network.

If only a limited number of containers are allowed to operate, it is sufficient to test whether the classifier safely recognizes these containers after training. If the usable containers are not, however, fully specified in the design phase, it is important to check that the classifier works well with containers that the classifier did not see during training. It is thereby necessary to classify additional containers not yet used for training the classifier for test purposes, and to check whether the classification of these additional containers is correct. Measures usually used against overfitting should otherwise be tried.

Another possible solution to avoid overflow in an incorrectly selected container is to use regression methods. In contrast to classifiers, the machine learning model here supplies a real number as an output value. This output value may, for example, be an estimate of the maximum fill volume for the actual container. Instead of measuring the geometry of the container and calculating the filling volume, the algorithm directly learns the assignment of sensor signals to the filling volume values. The filling volume must thereby be specified for each container during training. In addition to classical regression methods, such as "Linear Regression", "Winnow", "LASSO", "ARIMA" or "Ridge Regression", neural networks can also here be used.

Regardless of the learning method used, the question remains whether or not the learning process should be completed with the development phase. If so, the hardware used in the product can be made simpler since the required computational and storage capacities to make a prediction (regardless of whether it is a classification or a regression task) are much smaller than the required resources for the learning process. This is especially true for larger neural networks. Another advantage of the completion of the learning process in the development phase is that the behavior of the device does not later change. The device can therefore be thoroughly tested in the release procedure. If the device continues to learn during operation, however, operational problems may occur in the later phase of operation despite a thorough release procedure.

It can, for example, be advantageous if the filling device can additionally adapt to future containers which are not yet known during the development phase. The operator of the machines thus receives the opportunity to use new types of containers and to train the beverage machines themselves. The filling device must own the appropriate resources to be able to utilize learning algorithms during the operational phase. Either the necessary computing unit and the required storage capacity must be integrated directly into the filling device, or the filling device must have a connection to external resources. Advantage can, for example, be made of cloud services via a communication channel. The filling device can thereby learn the classification of novel containers.

Non-limiting embodiments of the present invention will be described below under reference to the drawings.

FIG. 1 shows a coffee machine 11 as an example for the filling device according to the present invention. The coffee machine 11 possesses a sensor, for example, a camera 12. The container used, in this case a coffee cup 13, can thus be recognized sensorially, for example, visually.

Figure 2:
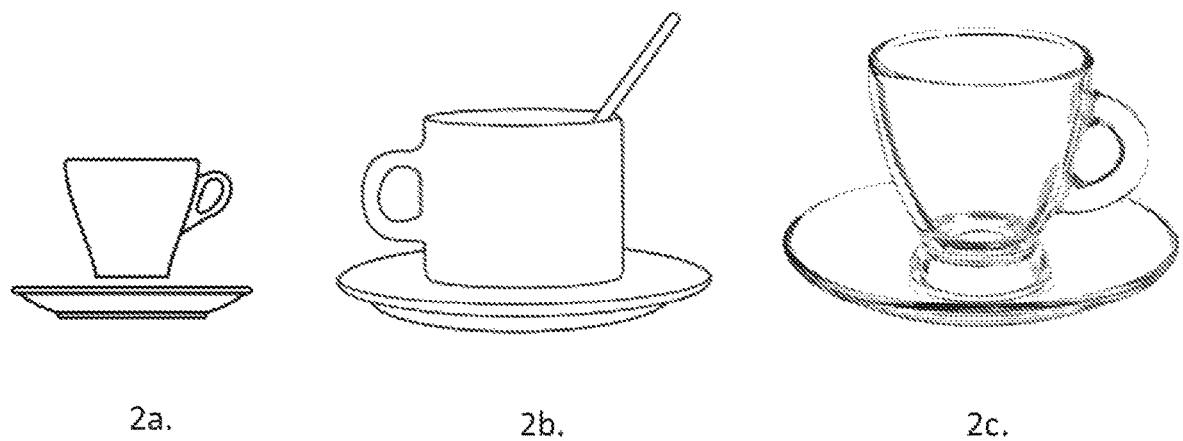
FIG. 2 shows examples of containers for the coffee machine of FIG. 1.

FIG. 2 shows some examples of containers for the coffee machine 11, such as an espresso cup 2a, a coffee cup 2b, and a glass 2c.

Figure 3:
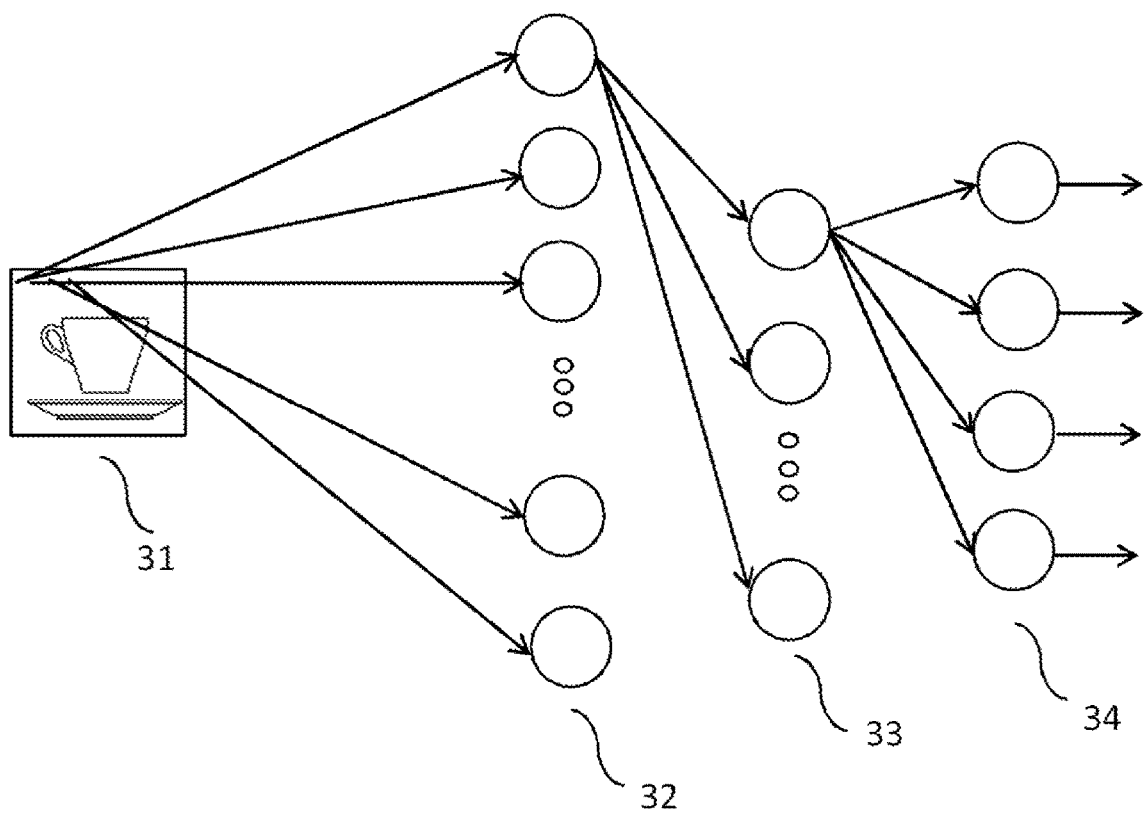
FIG. 3 shows in sketch form a neural network as an example of a learning machine integrated in the filling device, such as the coffee maker of FIG. 1.

FIG. 3 shows in sketch form a neural network as an example of a learning machine integrated in the filling device, such as the coffee maker 11. The sensor signals from the currently inserted container, such as the image 31 captured by the camera 12, are supplied pixel by pixel to input neurons 32. The arrows show some connections in this neural network. Reference numeral 33 symbolizes a hidden layer of neurons, whereby several layers may also occur (which are not shown in the drawings). The last row is of output neurons 34. The outputs provide the likelihood that the image provided by the camera can be classified into certain predefined classes, such as the espresso cup 2a, coffee cup 2b or glass 2c shown in FIG. 2.

Figure 4:
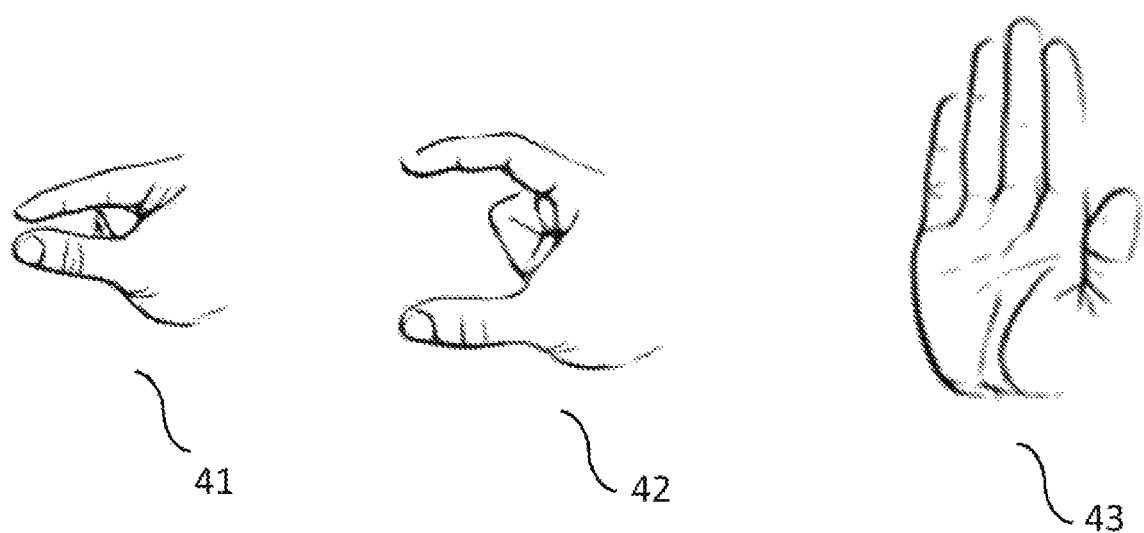
FIG. 4 shows some possible gestures for the operation of the coffee maker of FIG. 1 which can be additionally recognized by the integrated classifier.

FIG. 4 shows some possible gestures for the operation of the coffee maker 11 which can be additionally recognized by the integrated classifier. The exemplary gestures are: "a little" 41, "a lot" 42 and "stop" 43.

The present invention provides that any filling device provided with suitable sensors can be designed intelligently. The filling device is thereby able to categorize the currently used container which is to be filled with the desired material (gas, powder, granules, or liquid). The filling device rationally adapts its behavior based on the recognized container category. The filling device can, for example, issue a warning, limit the available options, adjust the quantity used for filling, or stop the filling process with an error message. In an embodiment of the present invention, the principle of the present invention can, for example, be explained by a coffee machine with an integrated camera.

The camera must be integrated in the coffee machine so that it can take the best possible pictures of the container. Depending on the design of the coffee machine, it may, for example, be useful to use multiple cameras. One or more light sources can be used to improve lighting conditions, the light sources are not, however, essential for container detection.

The camera applied can, for example, consist of components that are used space- and cost-effectively in large numbers in smartphones. The camera does not, however, need to have a very high resolution. The output of the camera advantageously provides brightness in the pixels in three colors according to the RGB color model. This data is passed to the classifier, whose task is to divide the container into predefined classes, for example, espresso cup, small or large coffee cup, coffee pot, glass for latte macchiato etc. It might also be advantageous to define at least two additional outputs in case no container is detected, i.e., the monitored area is empty, and in case no object within this area can be identified.

In an embodiment of the present invention, the classifier can, for example, be a neural network, for example a CNN ("convolutional neural network"). This network obtains as an input a vector with the data from the camera. The output for this network is a vector with individual values corresponding to the probabilities of how likely it is that the container can be assigned to the corresponding classes. The sum of all values must accordingly be 1. To accomplish this, the last layer of the neural network may, for example, be equipped with the "softmax" activation function.

The outputs of the classifier are directed to control the coffee machine. The control unit can then limit the selection of coffees accordingly or prevent an incorrect selection. The control unit can, for example, prevent latte macchiato from being poured into a coffee cup which is too small. The control unit can inform or warn the operator with available devices, such as via an LED, a plain text display, or via a voice output.

In order to train the neural network, the known containers must be placed in the coffee machine according to usual operating conditions and the camera output values and the associated coded identifier (for example, 1=espresso cup) must be stored. The training of the network can be realized with the "backpropagation" method. As an optimization method, for example, "Gradient Descent", "RMSprop" or "Adam" can be used. Libraries and tools are available for the software implementation of the algorithm such as "Tensorflow" from Google.

Complex neural networks with many layers and neurons require a great amount of training data to avoid overfitting. An advantageous solution is therefore the use of pre-trained networks which were trained for image recognition with very large data sets. For classification according to the present invention, it suffices if the uppermost one or two layers are re-trained application-specifically according to the principle of "transfer learning." The network can thereby learn to classify the containers relatively quickly from relatively few training data.

During the learning process, the parameters of the network for the classification task are optimally set ("trained"). The trained network can then perform the classification of the containers with the method "forward propagation." The coffee machine therefore only needs relatively few resources for this task and can therefore be manufactured relatively inexpensively. The hardware implementation can be carried out with components such as processors (CPU), microcontrollers (µC), digital signal processors (DSP), graphics processors (GPU), or tensor processing units (TPU). Other programmable devices, such as FPGAs, or application-specific integrated circuits (ASICs), also exist. The easiest way is to solve the problem with a finished single-board computer, such as "Raspberry Pi."

With the adaptation of the exemplary embodiment described here, any filling devices, vending machines, or household appliances can be designed to work with different containers.

In addition to container detection, the system of the present invention can also be trained to detect fault conditions. The status "coffee has overflowed" can, for example, be detected. In this case, the coffee maker stops the process to prevent further overflow.

In addition to detecting containers, the cameras can also be used for other purposes. According to the present invention, the camera can, for example, additionally serve as part of the human-machine interface.

By evaluating the camera signals, for example, gestures of the operator can also be interpreted. For this purpose, either the same neural network can be extended ("multi-task learning") or another neural network can be used. For example, the following hand gestures could be defined: "fill", "stop", "low", "many", etc. The neural network can be trained to recognize these gestures in a similar way as at the training to detect the containers. The output of the gesture recognition network (or, more generally, the gesture-trained classifier) is routed to the control unit. The control unit is thus able to respond appropriately to the information about the container used and the gesture of the operator.

The present invention is not limited to embodiments described herein; reference should be had to the appended claims.

What is claimed is:

1. A method for preventing a malfunction of a filling device when a container is filled by a user with a beverage, the method comprising:
    providing a filling device comprising,
        a control unit which is configured to control the filling device by at least one of limiting a selection of the beverage, preventing an incorrect selection of the beverage, stopping a dispensing of the beverage, and providing a warning to the user,
        a camera which is configured to take an image of a container which is currently being used with the filling device and to output the image thereof to a classifier,
        the classifier which uses a trained learning algorithm which is trained to analyze the output of the image provided by the camera of the container currently being used with the filling device;
    taking, via the camera, the image of the container which is currently being used with the filling device;
    outputting, from the camera, the image of the container which is currently being used with the filling device to the classifier;
    analyzing, via the trained learning algorithm of the classifier, which container is currently being used with the filling device based on characteristics of the container currently being used with the filling device so as to classify the container into a predefined class; and
    employing the predefined class by the control unit to prevent the malfunction of the filling device.

2. The method as recited in claim 1, wherein the malfunction is a filling of the container with an improper content of the beverage or an improper quantity of the beverage.

3. The method as recited in claim 1, wherein the trained learning algorithm of the classifier further classifies the container into a type of the container currently being used with the filling device.

4. The method as recited in claim 1, wherein the trained learning algorithm of the classifier is further trained to provide a probability vector whose individual values represent a probability that the container currently being used with the filling device is assignable to a previously defined category.

5. The method as recited in claim 1, wherein the trained learning algorithm of the classifier is a regression algorithm which provides an estimation of a maximum possible filling volume of the container currently being used with the filling device.

6. The method as recited in claim 1, wherein the trained learning algorithm of the classifier is an artificial neural network trained by a backpropagation method.

7. The method as recited in claim 6, wherein the artificial neural network is a pre-trained convolutional neural network.

8. The method as recited in claim 1, wherein the trained learning algorithm of the classifier is further trained to detect an overflow of the container, and if the overflow is detected, the method further comprises:

transmitting a signal to the control unit so that the control unit can control the filling device by at least one stopping the dispensing of the beverage and providing the warning to the user.

9. The method as recited in claim 1, wherein the trained learning algorithm of the classifier is further trained to recognize and categorize predefined human hand gestures, and the method further comprises:

transmitting the predefined human hand gestures recognized and categorized by the trained learning algorithm to the control unit so that the control unit can influence a mode of operation of the filling device based thereon.

10. The method as recited in claim 1, wherein,
the filling device is a coffee machine, and
the container to be filled includes a glass, a cup, a coffee cup, a cappuccino cup, a latte macchiato glass, and a jug.

11. A filling device for filling a container as recited in claim 1.

12. A method for preventing a malfunction of a filling device when a container is filled by a user with a beverage, the method comprising:

providing a filling device comprising,
a control unit which is configured to control the filling device by at least one of limiting a selection of the beverage, preventing an incorrect selection of the beverage, stopping a dispensing of the beverage, and providing a warning to the user,
a camera which is configured to take an image of a container which is currently being used with the filling device and to output the image thereof to a classifier, and
the classifier which uses a trained learning algorithm which is trained to analyze the output of the image provided by the camera of the container currently being used with the filling device;

taking, via the camera, the image of the container which is currently being used with the filling device;

outputting, from the camera, the image of the container which is currently being used with the filling device to the classifier;

analyzing, via the trained learning algorithm of the classifier, which container is currently being used with the filling device based on characteristics of the container currently being used with the filling device so as to classify the container into a predefined class; and employing the predefined class by the control unit to prevent the malfunction of the filling device, wherein, the malfunction is a filling of the container with an improper content of the beverage or an improper quantity of the beverage.

* * * * *